(12) United States Patent
Graesser (10) Patent No.: US 10,518,505 B2
(45) Date of Patent: Dec. 31, 2019

(54) MULTILAYERED ASSEMBLY, PRODUCTION THEREOF AND USE THEREOF

(71) Applicant: DANZER SERVICES SCHWEIZ AG, Baar (CH)

(72) Inventor: Johannes Graesser, Dresden (DE)

(73) Assignee: DANZER GMBH, Baar (CH)

( * ) Notice: Subject to any disclaimer, the term of this patent is extended or adjusted under 35 U.S.C. 154(b) by 450 days.

(21) Appl. No.: 15/181,593

(22) Filed: Jun. 14, 2016

(65) Prior Publication Data
US 2016/0361896 A1 Dec. 15, 2016

(30) Foreign Application Priority Data

Jun. 15, 2015 (EP) ..................................... 15001759

(51) Int. Cl.
| | | |
|---|---|---|
| *B32B 5/22* | (2006.01) | |
| *B32B 5/24* | (2006.01) | |
| *B32B 5/26* | (2006.01) | |
| *B32B 21/04* | (2006.01) | |
| *B32B 21/10* | (2006.01) | |

(Continued)

(52) U.S. Cl.
CPC .................. *B32B 7/12* (2013.01); *B32B 1/06* (2013.01); *B32B 3/08* (2013.01); *B32B 3/14* (2013.01); *B32B 3/16* (2013.01); *B32B 5/22* (2013.01); *B32B 5/24* (2013.01); *B32B 5/26* (2013.01); *B32B 7/00* (2013.01); *B32B 9/005* (2013.01); *B32B 9/047* (2013.01); *B32B 15/14* (2013.01); *B32B 21/04* (2013.01); *B32B 21/08* (2013.01); *B32B 21/10* (2013.01); *B32B 27/06* (2013.01); *B32B 37/10* (2013.01); *B32B 37/12* (2013.01); *B32B 37/14* (2013.01); *B44C 1/26* (2013.01); *B32B 2250/03* (2013.01); *B32B 2255/00* (2013.01); *B32B 2260/021* (2013.01); *B32B 2260/046* (2013.01); *B32B 2262/0253* (2013.01); *B32B 2262/0261* (2013.01); *B32B 2262/0276* (2013.01); *B32B 2262/04* (2013.01); *B32B 2262/101* (2013.01);

(Continued)

(58) Field of Classification Search
None
See application file for complete search history.

(56) References Cited

U.S. PATENT DOCUMENTS

| | | | |
|---|---|---|---|
| 2002/0136862 A1* | 9/2002 | Dong ...................... | B32B 21/08 428/150 |
| 2003/0057609 A1* | 3/2003 | Ratcliffe ................. | B44C 1/228 264/400 |

FOREIGN PATENT DOCUMENTS

| | | | | |
|---|---|---|---|---|
| DE | 19945800 A1 | 10/2000 | | |
| EP | 1424193 A1 | 6/2004 | | |
| GB | 1382319 A | * | 1/1975 | ............... B44C 1/26 |

OTHER PUBLICATIONS

Search Report prepared by the European Patent Office dated Oct. 1, 2015, for European Patent Application No. 15001759.8.

* cited by examiner

*Primary Examiner* — Jenna L Johnson
(74) *Attorney, Agent, or Firm* — Sheridan Ross P.C.

(57) ABSTRACT

Multi-layered assembly including at least:
  a decorative layer including a first decorative material and a second decorative material, wherein the first and second decorative materials lie in a or one plane and have the same thickness within the decorative layer;
  a first carrying layer for a glue layer, wherein the first carrying layer includes a plastic which is present in a woven or in a nonwoven;

(Continued)

wherein the glue layer bonds the decorative layer to the first carrying layer.

10 Claims, 2 Drawing Sheets

(51) Int. Cl.
    *B44C 1/26*         (2006.01)
    *B32B 27/06*       (2006.01)
    *B32B 7/12*         (2006.01)
    *B32B 7/00*         (2019.01)
    *B32B 9/00*         (2006.01)
    *B32B 9/04*         (2006.01)
    *B32B 15/14*       (2006.01)
    *B32B 21/08*       (2006.01)
    *B32B 1/06*         (2006.01)
    *B32B 3/08*         (2006.01)
    *B32B 3/14*         (2006.01)
    *B32B 3/16*         (2006.01)
    *B32B 37/10*       (2006.01)
    *B32B 37/12*       (2006.01)
    *B32B 37/14*       (2006.01)
    *E04F 15/02*       (2006.01)

(52) U.S. Cl.
    CPC ....... *B32B 2307/40* (2013.01); *B32B 2451/00* (2013.01); *E04F 15/02* (2013.01)

MULTILAYERED ASSEMBLY, PRODUCTION THEREOF AND USE THEREOF

CROSS-REFERNCE TO RELATED APPLICATIONS

This application claims the benefit of European Patent Application No. 15001759.8 filed Jun. 15, 2015, the entire contents of which are incorporated by reference herein.

FIELD OF THE INVENTION

The present invention relates to a multi-layered assembly having an intarsiate decorative layer, wherein a glue layer bonds the decorative layer to a carrying layer which includes a plastic which is present in a woven or nonwoven, and also to a method of producing the multi-layered assembly. The invention also relates to the use of the multi-layered assembly. The invention further also relates to a raw multi-layered assembly obtained as an intermediate product in the production of the multi-layered assembly.

BACKGROUND OF THE INVENTION

Intarsiate articles, as will be known, are obtainable by laying various woods, for example, into each other on a planar surface so as to re-establish a plan surface but which now contains differently coloured and differently structured inclusions. For example, a wood item, preferably a veneer, may be provided apertures whereinto the appropriately cut-to-size other wood, for example again a veneer, but also some other material such as, for example, a metal, may be inserted. Methods of this type require steps to be carried out by hand and so are inconvenient and costly. Methods have therefore been proposed as supposedly technically simpler and more economical.

GB 1 382 319 discloses a method of producing a wood veneer having therein an inlay, which may consist of metal for example. The method comprises pressing the metal into one side of the veneer until a or one surface of the metal is flush with the surface of the veneer. During the pressing operation, the other side of the veneer is supported by a deformable ply in the pressing tool. The wood projecting on this side as a result of being compressed by the metal is then sanded off until the fully wood-surrounded metal becomes visible. Thus produced wood veneers with metal inlays, however, may be vulnerable in applications associated with mechanical stresses in addition to their decorative purposes, since it is merely the tight fit which holds the inlay within the veneer. The inlay may thus have little by way of stabilization in the veneer and fall out of the latter under mechanical stress.

Stabilization methods whereby the inlay is glued into the veneer may likewise be unsatisfactory, since glue may egress between veneer and inlay and detract from the decorative impact.

Problem Addressed by the Invention

One problem addressed by the present invention is that of providing intarsiate articles having improved stability with unimpaired decorative effect that are obtainable on an industrial scale with improved economics.

SUMMARY OF THE INVENTION

This problem is solved by producing intarsiate articles by press moulding of decorative materials and sanding, while they are stabilized on the rear side by a carrying layer which includes a plastic and glue and is in the form of a woven or nonwoven, wherein the glue bonds the woven or nonwoven to the decorative materials. It is particularly advantageous that, in addition to their improved stability, articles of this type, which are in the form of a multi-layered assembly, are further processable in various ways for various applications, since especially the glue-containing woven or nonwoven makes further processing steps possible. For example, further materials can be applied which in turn are amenable to processing steps such as in situ spraying with plastics. The multi-layered assemblies obtained by the method according to the present invention are advantageous to apply to singly curved or slightly doubly curved surfaces, since the woven or nonwoven allows the multi-layered assembly to bend without breaking the decorative materials and thus ensures flexural stability and transverse tensile strength.

In a first aspect, therefore, the invention provides a multi-layered assembly including at least: a decorative layer including a first decorative material and a second decorative material, wherein the first and second decorative materials lie in a or one plane and have the same thickness within the decorative layer; a first carrying layer for a glue layer, wherein the first carrying layer includes a plastic which is present in a woven or in a nonwoven; wherein the glue layer bonds the decorative layer to the first carrying layer.

In one embodiment, the first decorative material consists of wood or includes wood.

In a further embodiment, the second decorative material is selected from the group consisting of wood, metal, plastic, ceramic, glass, fibreglass or carbon fibre or two or more thereof.

In a further embodiment, the first decorative material surrounds the second decorative material completely or only partially.

In one embodiment, the plastic of the first carrying material is selected from the group consisting of cellulose, polyester, polyether, polyamide, polysulphone or polyolefin or two or more thereof.

In a further embodiment, the glue of the glue layer is selected from the group consisting of melamine resin, phenolic resin, polyvinyl alcohol, polyurethane, ethylene-vinyl acetate or two or more thereof.

In one embodiment, a glue layer bonds the first carrying layer on the side remote from the decorative layer to a second carrying layer, wherein the second carrying layer includes a material selected from woodbase, wood, sheet metal, plastic, polymeric film or metal foil, or plastic which is present in a woven or nonwoven.

In a further embodiment, a glue layer bonds the first carrying layer on the side remote from the decorative layer to a second carrying layer, wherein the second carrying layer includes a material selected from woodbase, wood, sheet metal, plastic, polymeric film or metal foil, or plastic which is present in a woven or nonwoven, wherein the plastic of the woven or nonwoven is selected from the group consisting of cellulose, polyester, polyether, polyamide, polysulphone, polyolefin.

In one embodiment, the decorative layer has a thickness of 2 mm or less.

In one embodiment, the second carrying layer includes a plastic on the side remote from the first carrying layer, wherein this plastic is an additional plastic when the second carrying layer includes a plastic which is present in a woven or nonwoven.

In a second aspect, the invention provides a method of producing a multi-layered assembly as defined in the first aspect, including at least the steps (S) to (X) of:
(S) providing a first decorative material;
(T) contacting a second decorative material with the first decorative material;
(U) contacting a first carrying material with the second decorative material, wherein the first carrying material includes a plastic and glue, wherein the plastic is present in a woven or nonwoven;
(V) compressing the first decorative material with the second decorative material and the first carrying material in a pressing device at a temperature sufficient to activate the glue, wherein the first carrying material and the glue combine to form a first carrying layer and a glue layer, and wherein the second decorative material penetrates into the first decorative material and deforms a region of the first decorative material, wherein a surface of the first and second decorative materials lie in a plane on the first carrying layer and wherein the pressing device is constructed to include a deformable pressing pad capable of absorbing the region deformed in the first decorative material by the second decorative material, wherein the first and second decorative materials form a deformed decorative layer, wherein the glue layer bonds the deformed decorative layer to the first carrying layer;
(W) removing the compressed assembly of step (V) from the pressing device;
(X) sanding the deformed region of the decorative layer until the first and second decorative materials lie in a or one plane and have the same thickness.

In one embodiment, the deformable pressing pad includes a material which includes cellulose fibres, wherein there is no firm bond between the pressing pad and the pressing device.

In one embodiment, the pressure in the compressing step is in the range of 1-30 N/mm$^2$, preferably 5 to 30 N/mm$^2$, more preferably 20-30 N/mm$^2$ and the temperature is in the range of 50-200° C., preferably 100-180° C., more preferably 130-180° C.

In one embodiment, the method further includes the step (Y) of:
(Y) contacting the first carrying material with a second carrying material, wherein the second carrying material includes a material selected from woodbase, wood, sheet metal, plastic, polymeric film or metal foil or includes a plastic which is present in a woven or nonwoven, such that the compressing step changes the second carrying material into a second carrying layer which a glue layer bonds to the first carrying layer.

In a further embodiment, the method further includes the step (Z) of:
(Z) applying a plastic, preferably by in situ spraying, on that side of the second carrying layer which is remote from the first carrying layer.

In a third aspect, the invention provides for the use of a multi-layered assembly as defined in the first aspect, or the use of a multi-layered assembly obtained by a method as defined in the second aspect in furniture, vehicle, ship and aircraft construction and also in the manufacture of wall panels, interior decoration elements, floorings, housing and decor elements.

In a fourth aspect, the invention provides a raw multi-layered assembly obtained as an intermediate product in the production of the multi-layered assembly as defined in the first aspect. The invention accordingly provides a multi-layered assembly including at least: a decorative layer including a first decorative material and a second decorative material, wherein one surface of the first decorative material and one surface of the second decorative material lie in a or one plane within the decorative layer, the other surface of the first decorative material and the other surface of the second decorative material do not lie in a or one plane within the decorative layer such that the second decorative material deforms at least a region of the first decorative material; a first carrying layer for a glue layer, wherein the carrying layer includes a plastic which is present in a woven or in a nonwoven; wherein the glue layer bonds that side of the decorative layer which is remote from the deformed region to the first carrying layer.

In one embodiment, a material which includes cellulose fibres adheres to at least the region of the first decorative material which has undergone a change in shape due to the second decorative material.

This multi-layered assembly is obtainable by a method including at least the steps (S) to (W) as defined in the second aspect.

The multi-layered assembly whereto material adheres which includes cellulose fibres is obtainable by a method wherein the deformable pressing pad includes a material which includes cellulose fibres, wherein there is no firm bond between the pressing pad and the pressing device.

SHORT DESCRIPTION OF THE FIGURES

In the figures.

DETAILED DESCRIPTION OF THE INVENTION

Hereinbelow the terms set within quotation marks are defined within the meaning of the invention.

In a first aspect, the invention provides a multi-layered assembly including at least: a decorative layer including a first decorative material and a second decorative material, wherein the first and second decorative materials lie in a or one plane and have the same thickness within the decorative layer; a first carrying layer for a glue layer, wherein the carrying layer includes a plastic which is present in a woven or in a nonwoven; wherein the glue layer bonds the decorative layer to the first carrying layer.

The term "multi-layered assembly" is to be understood as meaning an assembly of identical or different materials arranged in layers above or below each other to form an assembly, namely the multi-layered assembly of the present invention.

The term "layer" is to be understood as meaning one ply of a material, preferably of a decorative material, of a carrying material or of a glue, wherein the layer preferably includes planar surfaces.

The term "decorative layer" is to be understood as meaning a layer which is effectful, effectual, effective, embellishing or ornamental. This is generally a matter for the observer's subjective impression.

The term "material" is to be understood as meaning an article in any desired composition and form. Materials are preferably wood, preferably in the form of a veneer, metal, plastic, ceramic or two or more thereof.

The term "decorative material" is to be understood as meaning an article which is effectful, effectual, effective, embellishing or ornamental in any desired composition and form. This is also generally a matter for the observer's subjective impression.

Owing to the subjectivity of the terms "decorative", the terms "decorative layer" and "decorative material" ("first decorative material", "second decorative material") may also be merely used herein in the meaning of "layer" and "material" ("first material", "second material").

The multi-layered assembly is not limited to two decorative materials, but may include any of decorative materials, i.e. a first decorative material, a second decorative material, a third decorative material, a fourth decorative material, a fifth decorative material, and so on and so forth.

In one embodiment, a or one material may consist of wood, metal, plastic, ceramic or two or more thereof, or include wood, metal, plastic, ceramic or two or more thereof.

The first and second decorative materials may be identical to or different from each other.

In one embodiment, the first decorative material consists of wood or includes wood. The wood is then preferably in the form of a veneer.

The term "veneer" comprehends slices of wood having a thickness between 0.1 mm and 6 mm, preferably 0.1 to 2 mm, more preferably 0.1 mm to 1 mm or less than 0.8 mm.

In one embodiment, the second decorative material is selected from wood, metal, plastic, ceramic, glass, fibreglass or carbon fibre or two or more thereof.

In one embodiment, both the first decorative material and the second decorative material are of wood or include wood. It is then preferable to select for the second decorative material a wood other than the wood of the first decorative material.

In one embodiment, the first decorative material consists of wood and the second decorative material consists of metal.

In a further embodiment, the first decorative material includes wood and the second decorative material includes metal.

The term "metal" comprehends alloys as well as pure metals.

Aluminium, copper and brass are examples of metals.

The first decorative material and the second decorative material may be disposed in the decorative layer in any arrangement provided they lie in a or one plane and have the same thickness.

The term "same thickness" tolerates differences by up to $1/10$ mm between the decorative materials.

In one embodiment, the first decorative material completely surrounds the second decorative material.

The term "wherein the first and second decorative materials lie in a or one plane and have the same thickness within the decorative layer, and the first decorative material surrounds the second decorative material" is to be understood as meaning that the first and second decorative materials constitute intarsi which are arranged on a planar surface, namely the glue layer, inside each other such that a plan surface is re-established but which may now contain differently coloured and differently structured inclusions.

The term "intarsia" is to be understood as meaning a decoration technique in the form of inlaying where identical or different materials as defined herein are laid on top of each other on a plan surface, namely the first carrying layer, such that, following the processing as herein defined, the result is again a plan surface but which now contains differently coloured and/or differently structured inclusions.

In a further embodiment, the first decorative material does not surround the second decorative material completely, i.e. the first decorative material surrounds the second decorative material partially only.

In one embodiment, the first decorative material has a sheetlike configuration and the second decorative material likewise has a sheetlike configuration.

In a further embodiment, the first decorative material has a sheetlike configuration and the second decorative material has a line-shaped or elongate configuration.

The term "first carrying layer" is to be understood as meaning a layer of a material which is suitable for carrying a glue layer. According to the present invention, the first carrying layer includes a material, namely a plastic which is present in a woven or nonwoven.

The term "plastic" is to be understood as meaning an organic polymeric solid-state body produced synthetically or semi-synthetically from monomeric organic molecules or from biomolecules. The plastic may be a thermoplastic, a thermoset or a thermoplastic.

Preferred plastics are selected from the group consisting of cellulose, polyester, polyether, polyamide, polysulphone or polyolefin or two or more thereof.

The term "nonwoven" is to be understood as meaning a product formed from fibres of finite length, continuous-filament fibres or cut yarns of any kind and any origin, which have been joined together into a fibrous layer in any desired manner and have been bonded together in any desired manner, but which have not been woven together.

The term "woven" is to be understood as meaning a product formed from fibres of finite length, continuous-filament fibres or cut yarns of any kind and any origin, which have been joined together into a fibrous layer in any desired manner and have been bonded together in any desired manner, and which have been woven together.

The term "glue layer" is to be understood as meaning a layer of a glue or adhesive.

The terms "glue" and "adhesive" are used interchangeably.

In one embodiment, the glue of the glue layer is selected from the group consisting of melamine resin, phenolic resin, polyvinyl alcohol, polyurethane, ethylene-vinyl acetate or two or more thereof.

The glue is situated on the first carrying layer, i.e. in the glue layer, but may also be situated in the carrying layer, i.e. in the nonwoven and/or on the plastic or plastics of the nonwoven, or in the woven and/or on the plastic or plastics of the woven.

In one embodiment, a glue layer bonds the first carrying layer on the side remote from the decorative layer to a second carrying layer.

The term "second carrying layer" is to be understood as meaning a layer of a material which is suitable for carrying the first carrying layer. Since the first carrying layer includes glue, i.e. in and on the surfaces of the first carrying layer, the glue of the first carrying layer bonds the second carrying layer to the first carrying layer.

The second carrying layer may be a material selected from the group consisting of woodbase, wood, sheet metal, plastic, polymeric film or metal foil or two or more thereof.

The term "woodbase" comprehends any engineered wood product formed by comminuting wood and then joining the resulting structural elements together. Wood flakes, for example, may be joined together into a woodbase product by resination. Wood fibres may also be joined together to form woodbase products, for example in the form of the familiar "HD wood fiber boards".

In a preferred embodiment, the second carrying layer includes a plastic which is present in a woven or nonwoven.

The woven or nonwoven of the second carrying layer includes a plastic selected from the group consisting of cellulose, polyester, polyether, polyamide, polysulphone, polyolefin or two or more thereof.

Thus, the plastic of the woven or nonwoven of the second carrying layer may be identical to the plastic of the woven or nonwoven of the first carrying layer or different therefrom.

In one embodiment, the decorative layer has a thickness of 2 mm or less, preferably 1 mm or less or less than 0.8 mm.

In a further embodiment, the first carrying layer—and when the multi-layered assembly includes a second carrying layer including a plastic present in a woven or nonwoven—each has/have a thickness in the range from 0.05 to 0.5 mm, preferably from 0.1 to 0.4 mm.

The thickness of the second carrying layer is generally not limited in the case of materials other than a plastic which includes a woven or nonwoven. The thickness is then preferably up to 2 mm, preferably when the second carrying layer is preferably present as sheet metal or as woodbase.

In a further embodiment, the second carrying layer includes a plastic on the side remote from the first carrying layer. When the second carrying layer is in the form of a plastic present in a woven or nonwoven, this second carrying layer thus contains an additional plastic on the side which is remote from the first carrying layer.

In one embodiment, the plastic or the additional plastic is selected from acrylic-butadiene-styrene copolymers, styrene-acrylonitrile copolymers, acrylate-styrene-acrylonitrile copolymers or two or more thereof.

This additional plastic may be designed to include holding devices whereby the multi-layered assembly is securable to a surface or bondable to another component part. As explained in the second aspect of the invention, this additional plastic may be applied by in situ spraying.

In a second aspect, the invention provides a method of producing the multi-layered assembly of the invention.

The method includes at least the steps (S) to (X) of:
(S) providing a first decorative material;
(T) contacting a second decorative material with the first decorative material;
(U) contacting a first carrying material with the second decorative material, wherein the first carrying material includes a plastic and glue, wherein the plastic is present in a woven or nonwoven;
(V) compressing the first decorative material with the second decorative material and the first carrying material in a pressing device at a temperature sufficient to activate the glue, wherein the first carrying material and the glue combine to form a first carrying layer and a glue layer, and wherein the second decorative material penetrates into the first decorative material and deforms a region of the first decorative material, wherein a surface of the first and second decorative materials lie in a or one plane on the first carrying layer and wherein the pressing device is constructed to include a deformable pressing pad capable of absorbing the region deformed in the first decorative material by the second decorative material, wherein the first and second decorative materials form a deformed decorative layer, wherein the glue layer bonds the deformed decorative layer to the first carrying layer;
(W) removing the compressed assembly of step (V) from the pressing device;
(X) sanding the deformed region of the decorative layer until the first and second decorative materials lie in a or one plane and have the same thickness.

The terms "deformed region" and "deformed decorative layer" refer respectively to a vaulted region and a vaulted layer.

The term "sanding the deformed region of the decorative layer until the first and second decorative materials lie in a or one plane and have the same thickness" thus is to be understood as meaning that the surfaces of the first decorative material and of the second decorative material, i.e. the respective top sides and the respective bottom sides, are each in a or one plane within a tolerable discrepancy of $\frac{1}{10}$ mm.

The step of sanding may be effected both manually and mechanically, although mechanical sanding is preferable for the purposes of an economical form of production.

In one embodiment, the method includes at least the steps (S), (T1), (U1), (V), (W) and (X) of:
(S) providing a first decorative material;
(T1) positioning a second decorative material underneath the first decorative material;
(U1) positioning a first carrying material underneath the second decorative material, wherein the first carrying material includes a plastic and glue, wherein the plastic is present in a woven or nonwoven;
(V) compressing the first decorative material with the second decorative material and the first carrying material in a pressing device at a temperature sufficient to activate the glue, wherein the first carrying material and the glue combine to form a first carrying layer and a glue layer, and wherein the second decorative material penetrates into the first decorative material and deforms a region of the first decorative material, wherein a surface of the first and second decorative materials lie in a or one plane on the first carrying layer and wherein the pressing device is constructed to include a deformable pressing pad capable of absorbing the region deformed in the first decorative material by the second decorative material, wherein the first and second decorative materials form a deformed decorative layer, wherein the glue layer bonds the deformed decorative layer to the first carrying layer;
(W) removing the compressed assembly of step (V) from the pressing device;
(X) sanding the deformed region of the decorative layer until the first and second decorative materials lie in a or one plane and have the same thickness.

In a further embodiment, the method includes at least the steps (S), (T2), (U2), (V), (W) and (X) of:
(S) providing a first decorative material;
(T2) positioning a second decorative material atop the first decorative material;
(U2) positioning a first carrying material atop the second decorative material, wherein the first carrying material includes a plastic and glue, wherein the plastic is present in a woven or nonwoven;
(V) compressing the first decorative material with the second decorative material and the first carrying material in a pressing device at a temperature sufficient to activate the glue, wherein the first carrying material and the glue combine to form a first carrying layer and a glue layer, and wherein the second decorative material penetrates into the first decorative material and deforms a region of the first decorative material, wherein a surface of the first and second decorative materials lie in a or one plane on the first carrying layer and wherein the pressing device is constructed to include a deformable pressing pad capable of absorbing the region deformed in the first decorative material by the second decorative material, wherein the first and second decorative materials form a deformed decorative layer, wherein the glue layer bonds the deformed decorative layer to the first carrying layer;

(W) removing the compressed assembly of step (V) from the pressing device;

(X) sanding the deformed region of the decorative layer until the first and second decorative materials lie in a or one plane and have the same thickness.

Carrying materials in step (U)/(U1) and (U2), which include a plastic and glue, wherein the plastic is present in a woven or nonwoven, are known and commercially available.

The term "activation of glue" is to be understood as meaning that the glue, which is in and on the first carrying material, generally does not have any tacky properties at room temperature, but that it is only the application of heat, which may cause the glue to soften or to partially or completely melt, which creates the properties which leads to adherence of the decorative layer to the carrying layer.

Accordingly, in one embodiment, the glue may be present as hot-melt adhesive, for example in the form of ethylene-vinyl acetate.

In a further embodiment, the form which the glue takes is such that heating activates reactive groups in the glue, for example methylol groups in the case of a melamine resin. These reactive groups can then react with suitable groups in the decorative layer such that the decorative layer adheres to the carrying layer.

The term "pressing device" is to be understood as meaning any device suitable for carrying out step (V). Pressing devices of this type preferably include pressing jaws wherebetween the materials envisaged for producing the multi-layered assembly are suitably positioned. The term "pressing jaw" is used interchangeably with the term "press platen".

The term "pressing pad" is to be understood as preferably meaning a material which by virtue of its ability to change shape under pressure is suitable for transferring the pressure full-facially to the multi-layered assembly to be produced, i.e. for distributing the pressure in a very uniform manner.

Suitable materials for the pressing pad of the pressing device may preferably be selected from deformable materials such as rubber, silicone, polyurethane, materials which include cellulose fibres, such as paper, preferably kraft paper, or paperboard, or else from woodbase products. The pressing jaws of the pressing device may include a polymeric film to protect the multi-layered assembly from damage. A polymeric film of this type may also prevent the multi-layered assembly adhering to the pressing tool.

In one embodiment, the deformable pressing pad includes a material which includes cellulose fibres.

One embodiment comprises a firm attachment of the pressing pad in the pressing device.

In a further embodiment, the pressing pad is removable from the pressing device. In this embodiment, the pressing pad may adhere to the deformed decorative layer preferably after the step (V) of compressing and may be removed from the pressing device in step (W) together with the as yet unsanded multi-layered assembly. After the adherent pressing pad has been removed, the raw multi-layered assembly may then be sanded as per step (X).

The pressure in the compressing step is preferably in the range of 1-30 N/mm², preferably 5 to 30 N/mm², more preferably 20-30 N/mm².

The temperature at the site of action is preferably in the range of 50-200° C., preferably 100-180° C., more preferably 130-180° C.

In a preferred embodiment, the pressure and the temperature are respectively in the range of 20-30 N/mm² and in the range of 130-180° C.

Press time is preferably in the range from 20 to 360 s.

One embodiment of the method may comprise contacting the first carrying material with a second carrying material in order that a glue layer shall bond the first carrying layer on the side remote from the decorative layer to the second carrying layer.

The co-use of a second carrying material is preferable in one embodiment because glue may also egress from the first carrying material on the side remote from the decorative materials. This may impair the visual impression or the further processing. To avoid this impairment, this glue may then bond the first carrying material to the second carrying material, so that the surfaces of the multi-layered assembly formed are preferably free from glue or substantially free from glue. This may be advantageous for the visual impression or the further processing of the multi-layered assembly.

In a further embodiment, however, the glue from the first carrying material may also be situated on the second carrying material, if this is tolerable.

The second carrying material may be a material selected from the group consisting of woodbase, wood, sheet metal, plastic, polymeric film or metal foil or two or more thereof.

In a preferred embodiment, the second carrying material includes a plastic which is present in a woven or nonwoven.

Wovens or nonwovens of this type are known and commercially available.

The woven or nonwoven of the second carrying material includes a plastic preferably selected from the group consisting of cellulose, polyester, polyether, polyamide, polysulphone, polyolefin or two or more thereof.

Therefore, the plastic of the woven or nonwoven of the second carrying material may be identical to the plastic of the woven or nonwoven of the first carrying material or may be different therefrom.

In one embodiment, the method includes the step (Y) of:

(Y) contacting the first carrying material with a second carrying material, wherein the second carrying material includes a material selected from wood, sheet metal, plastic, polymeric film or metal foil or a plastic which is present in a woven or nonwoven, such that the compressing step changes the second carrying material into a second carrying layer which a glue layer bonds to the first carrying layer.

In one embodiment, the method includes the step (Y1) when the steps (T1) and (U1) are used in the method:

(Y1) positioning the first carrying material atop a second carrying material, wherein the second carrying material includes a plastic which is present in a woven or nonwoven, such that the compressing step changes the second carrying material into a second carrying layer which a glue layer bonds to the first carrying layer.

In a further embodiment, the method includes the step (Y2) when the steps (T2) and (U2) are used in the method:

(Y2) positioning the first carrying material beneath a second carrying material, wherein the second carrying material includes a plastic which is present in a woven or nonwoven, such that the compressing step changes the second carrying material into a second carrying layer which a glue layer bonds to the first carrying layer.

In a further embodiment, the free surface of the second carrying layer may be further processed. A plastic may preferably be applied to this surface in a known manner, preferably by in situ spraying. This plastic is preferably selected from acrylic-butadiene-styrene copolymers, styrene-acrylonitrile copolymers, acrylate-styrene-acrylonitrile copolymers or two or more thereof. The second carrying layer may prevent the ingress of this plastic into the first carrying layer or even into the decorative layer.

Therefore, in one embodiment, the method further includes the step (Z) of:

(Z) applying a plastic to that side of the second carrying layer which is remote from the first carrying layer.

Figure 1:
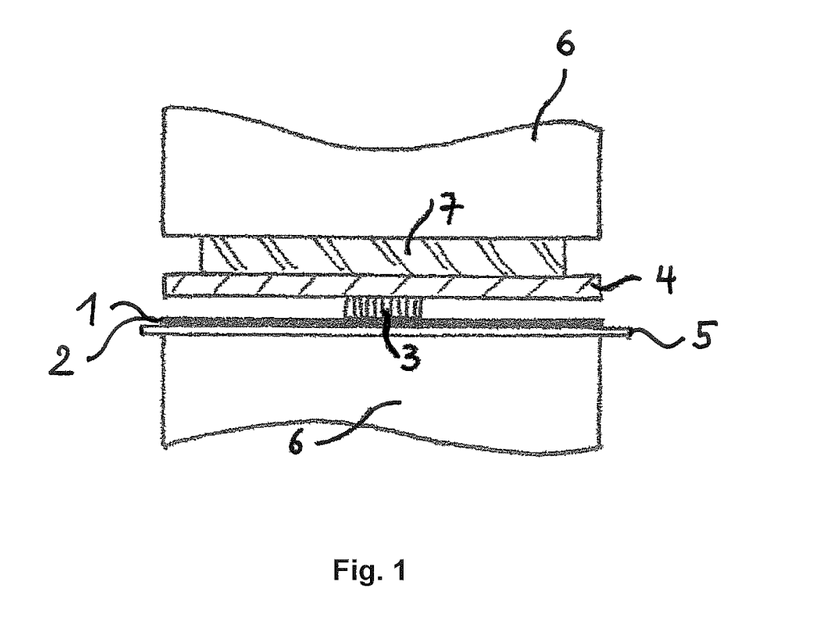
FIG. 1 shows the stocking of a pressing device, which includes pressing jaws or press platens, with starting materials for producing a multi-layered assembly of the invention.

FIG. 1 shows the stocking of a pressing device, which includes pressing jaws or press platens 6 and a pressing pad 7, with a first and a second decorative material. The first decorative material is a veneer 4 wherebeneath a second decorative material in the form of a metal 3, also known as metal intarsio, is positioned. The second decorative material 3 is positioned atop a first carrying material 1 in the form of a polymeric nonwoven. The nonwoven includes glue 2. The glue is situated in the nonwoven, but may additionally also be situated on or under the nonwoven. A second carrying material 5, preferably in the form of a polymeric nonwoven, is situated under the first carrying material.

Figure 2:
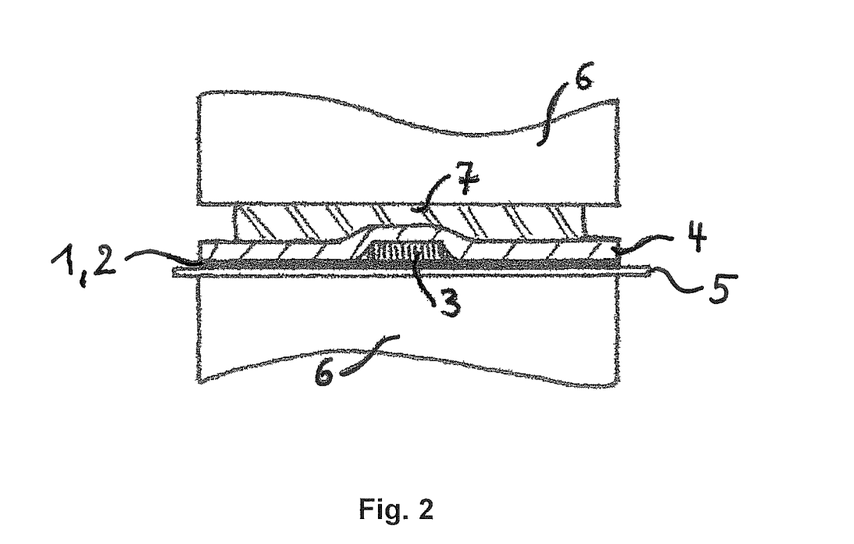
FIG. 2 shows the closing of the pressing device and/or of the pressing jaws of the pressing device to exert heat and pressure.

FIG. 2 shows the closing of the press to exert heat and pressure, during which the metal intarsio 3 penetrates into the veneer 4 and deforms it. Owing to the heat effect and the pressure from closing the pressing jaws 6 of the pressing device, the glue 2 melts and forms a glue layer which forms a firm adhesive bond between the first carrying material 1, namely the nonwoven, the metal intarsio 3 and the veneer 4. At the same time, a firm adhesive bond is also formed in the form of a further glue layer (not depicted), which develops between the first carrying material 1 and the second carrying material 5.

The term "firm adhesive bond" is to be understood as meaning that the adhesive bond does not come undone when the multi-layered assembly is stored for one hour in hot water at a temperature of 80° C.

Figure 3:
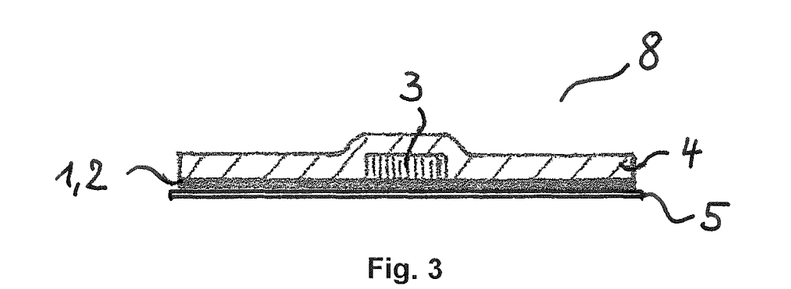
FIG. 3 shows the raw compressed multi-layered assembly of the invention.

FIG. 3 shows the raw compressed multi-layered assembly 8 removed from the pressing device after the pressing jaws have opened. The second decorative material, namely the metal 3, is caused by the compressing step to penetrate into the first decorative material, namely the veneer 4, and deform it to form a deformed decorative layer. A or one surface of the first decoration material and a or one surface of the second decorative material lie in a or one plane.

Figure 4:
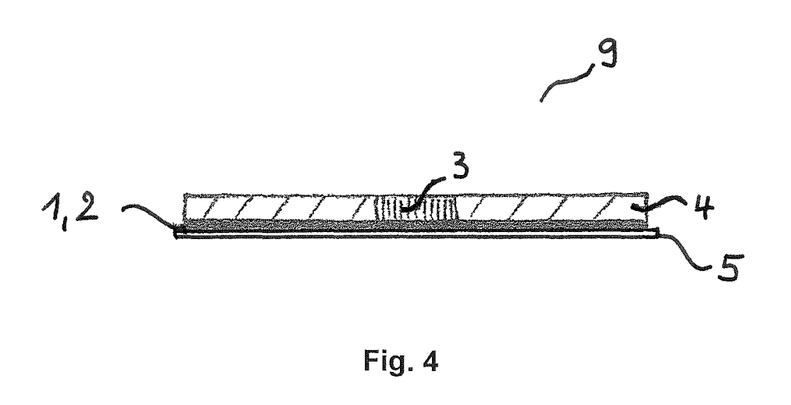
FIG. 4 shows the sanded multi-layered assembly of the invention.

FIG. 4 shows the sanded multi-layered assembly 9 resulting from the deformed region of the decorative layer of the compressed raw multi-layered assembly 8 being sanded off until the first decorative material 4 and the second decorative material 3 lie in a or one plane or are sheetlike and have the same thickness.

In a third aspect, the invention provides for the use of a multi-layered assembly as defined in the first aspect or of a multi-layered assembly obtained by a method as defined in the second aspect.

The multi-layered assembly may be used in furniture, vehicle, ship and aircraft construction and also in the manufacture of wall panels, interior decoration elements, floorings, housing and decor elements.

In a fourth aspect, the invention provides the compressed raw multi-layered assembly as illustratively depicted in FIG. 3.

The invention accordingly provides a multi-layered assembly including at least: a decorative layer including a first decorative material and a second decorative material, wherein a or one surface of the first decorative material and a or one surface of the second decorative material lie in a or one plane within the decorative layer, the other surface of the first decorative material and the other surface of the second decorative material do not lie in a or one plane within the decorative layer such that the second decorative material deforms at least a region of the first decorative material; a first carrying layer for a glue layer, wherein the carrying layer includes a plastic which is present in a woven or in a nonwoven; wherein the glue layer bonds that side of the decorative layer which is remote from the deformed region to the first carrying layer.

The term such that the second decorative material deforms at least a region of the first decorative "material" is to be understood as meaning that, in the decorative layer, the first decorative material covers the second decorative material at least partly.

The term "deformed" is used interchangeably with the term "changed in shape".

In a further embodiment, the pressing pad of the pressing device is included on the deformed decorative layer of this raw multi-layered assembly. This pressing pad, adherent to the raw multi-layered assembly, may be detached therefrom.

In one embodiment, the pressing pad forms a detachable layer on the multi-layered assembly. In one embodiment, the multi-layered assembly includes a detachable layer of a material which includes cellulose fibres.

The raw multi-layered assembly is obtainable by a method which includes at least the steps (S) to (W) defined in the second aspect, but does not include the step (X).

LIST OF REFERENCE SIGNS 1 first carrying material
2 glue in the form of a glue film or of a glue layer
3 second decorative material, for example metal
4 first decorative material, for example wood in the form of a veneer
5 second carrying material
6 pressing jaws or press platens of a pressing device
7 pressing pad
8 multi-layered assembly with deformed decorative layer
9 sanded multi-layered assembly

What is claimed is:

1. A multi-layered assembly including at least:
a decorative layer including a first decorative material and a second decorative material, wherein the first and second decorative materials lie in a plane and have the same thickness within the decorative layer, wherein the first decorative material comprises wood in the form of a veneer, and wherein the second decorative material is selected from the group consisting of wood, metal, plastic, ceramic, glass, fiberglass, carbon fiber, and two or more thereof;
a first carrying layer for a glue layer, wherein the first carrying layer includes a plastic selected from the group consisting of polyester, polyether, polyamide, polysulphone, polyolefin, or two or more thereof, or wherein the first carrying layer includes cellulose, and wherein the plastic or cellulose is present in a woven or in a nonwoven;
wherein the glue layer bonds the decorative layer to the first carrying layer;

wherein a second glue layer bonds the first carrying layer on a side remote from the decorative layer to a second carrying layer; and wherein the second carrying layer includes a woven or nonwoven carrying material selected from the group consisting of cellulose, polyester, polyether, polyamide, polysulphone, polyolefin, or two or more thereof.

2. The multi-layered assembly according to claim 1, wherein the decorative layer has a thickness of 2 mm or less.

3. A multi-layered assembly including at least:
- a decorative layer including a first decorative material and a second decorative material, wherein one surface of the first decorative material and one surface of the second decorative material lie in a plane within the decorative layer, the other surface of the first decorative material and the other surface of the second decorative material do not lie in the plane within the decorative layer such that the second decorative material deforms at least a region of the first decorative material, wherein the first decorative material comprises wood in the form of a veneer, and wherein the second decorative material is selected from the group consisting of wood, metal, plastic, ceramic, glass, fiberglass, carbon fiber, and two or more thereof;
- a first carrying layer for a glue layer, wherein the first carrying layer includes a plastic selected from the group consisting of polyester, polyether, polyamide, polysulphone, polyolefin, or two or more thereof, or wherein the first carrying layer includes cellulose, wherein the plastic or cellulose is present in a woven or in a nonwoven;
- wherein the glue layer bonds a side of the decorative layer which is remote from the deformed region to the first carrying layer;
- wherein a second glue layer bonds the first carrying layer on a side remote from the decorative layer to a second carrying layer; and
- wherein the second carrying layer includes a woven or nonwoven carrying material selected from the group consisting of cellulose, polyester, polyether, polyamide, polysulphone, polyolefin, or two or more thereof.

4. The multi-layered assembly according to claim 3, wherein a material which includes cellulose fibers adheres to at least the deformed region of the first decorative material which has undergone a change in shape due to the second decorative material.

5. The multi-layered assembly according to claim 1, wherein the first decorative material at least partially surrounds the second decorative material.

6. The multi-layered assembly according to claim 1, wherein a glue of the glue layer is selected from the group consisting of melamine resin, phenolic resin, polyvinyl alcohol, polyurethane, ethylene-vinyl acetate, or two or more thereof.

7. The multi-layered assembly according to claim 1, wherein the second carrying layer includes a second plastic on a side remote from the first carrying layer.

8. The multi-layered assembly according to claim 1, wherein the decorative layer has a thickness of 2 mm or less, wherein the second carrying layer includes a second plastic on a side remote from the first carrying layer.

9. The multi-layered assembly according to claim 1, wherein the second decorative material is a metal.

10. The multi-layered assembly according to claim 3, wherein the second decorative material is a metal.

* * * * *